(12) United States Patent
Hubacher et al.

(10) Patent No.: US 9,145,095 B2
(45) Date of Patent: Sep. 29, 2015

(54) BICYCLE SUPPORT APPARATUS AND METHOD

(71) Applicants: Kenneth E. Hubacher, Cedar Park, TX (US); Gregory A. Keshishian, Austin, TX (US)

(72) Inventors: Kenneth E. Hubacher, Cedar Park, TX (US); Gregory A. Keshishian, Austin, TX (US)

(*) Notice: Subject to any disclaimer, the term of this patent is extended or adjusted under 35 U.S.C. 154(b) by 79 days.

(21) Appl. No.: 14/150,050

(22) Filed: Jan. 8, 2014

(65) Prior Publication Data

US 2015/0191129 A1    Jul. 9, 2015

(51) Int. Cl.
*B60R 9/10* (2006.01)
*B62H 3/00* (2006.01)

(52) U.S. Cl.
CPC ... *B60R 9/10* (2013.01); *B62H 3/00* (2013.01); *Y10S 224/924* (2013.01)

(58) Field of Classification Search
CPC ..... B62H 3/00; B62H 3/10–3/12; B60R 9/10; B25H 1/0007; B25H 1/0014
USPC ................. 224/924, 502, 504, 508, 484, 486; 221/17–22; 410/3
See application file for complete search history.

(56) References Cited

U.S. PATENT DOCUMENTS

| | | | | |
|---|---|---|---|---|
| 3,757,975 A | * | 9/1973 | Sneider | 414/462 |
| 3,891,132 A | * | 6/1975 | Chandler | 224/509 |
| 4,629,104 A | * | 12/1986 | Jacquet | 224/324 |
| 5,497,927 A | * | 3/1996 | Peterson | 224/519 |
| 5,497,967 A | * | 3/1996 | Gantois | 248/166 |
| 2011/0108364 A1 | * | 5/2011 | Pacheco, Jr. | 187/220 |
| 2012/0037678 A1 | * | 2/2012 | Hsu | 224/534 |

* cited by examiner

*Primary Examiner* — Justin Larson
*Assistant Examiner* — Phillip Schmidt
(74) *Attorney, Agent, or Firm* — Kevin L. Daffer; Daffer McDaniel LLP

(57) ABSTRACT

According to one embodiment, a bicycle support apparatus and method is provided. The bicycle support apparatus can support a bicycle in a horizontal or vertical direction. The bicycle support apparatus can also be secured to any horizontal, vertical, or any angular face. Still further, the bicycle support apparatus can be mounted onto a moveable object, such as an automobile. Slideably secured to an elongated member of the support apparatus is a bicycle fork securement member and a bicycle bottom bracket pad. The securement member secures the fork of the bicycle, and the bicycle bottom bracket rests on the pad. Such securement can be vertically, horizontally, stationary, or moveable configurations.

19 Claims, 4 Drawing Sheets

BICYCLE SUPPORT APPARATUS AND METHOD

BACKGROUND OF THE INVENTION

1. Field of the Invention

This invention relates to a bicycle having a pedal by which a user can be transported via turning the pedal and, more particularly, an apparatus and method for supporting a pedaled bicycle to a moveable or stationary item.

2. Description of the Related Art

The following descriptions and examples are given as background only.

There are several different types of bicycles available on the market. The bicycle to which the present support apparatus and method is tailored is that of a lightweight bicycle and, more specifically, a bicycle having pedals for manual propulsion. The bicycle support apparatus is constructed of lightweight material. Therefore, its use is limited to a lightweight, pedaled bicycle, and not a heavy motorized bicycle, such as a motorcycle.

There are numerous types of bicycle support apparatuses available on the market. Those apparatuses range from ones that support a pedaled bicycle, either on a movable object, such as an automobile, or on a stationary object, such as a wall, floor or bench. However, generally speaking, conventional bicycle support apparatuses are not ones that can be mounted on both a movable or stationary object. Nor can conventional bicycle support apparatuses be easily carried between a moveable or stationary mount. Further, typical bicycle support apparatuses cannot easily be placed into a collapsed, low-profile configuration in which a user can easily carry between, store when not in use, or deploy from a collapsed configuration onto moveable or stationary mounts.

Therefore, a need exists for a bicycle support apparatus and method that is lightweight to support a pedaled bicycle, and can support such a bicycle either on a movable or stationary item. Moreover, a further need exists in having a support apparatus that can collapse onto itself for ease of transport from, for example, a moveable object, such as a hitch on an automobile to a stationary object, such as a floor, wall, or bench—and vice-versa. Still further, a need exists for having a bicycle support apparatus that can be mounted on a horizontal or vertical surface, when placed in a stationary position so as to accommodate various types of surfaces on which a user can operate on or clean the bicycle.

SUMMARY OF THE INVENTION

The problems outlined above are solved, in part, by the present bicycle support apparatus having an elongated member on which a bicycle can be supported either in a horizontal or vertical direction. According to one embodiment, the elongated member can have a first rotatable securement member at one end and a second rotatable securement member at the other, opposite end. Both first and second rotatable securement members can pivot in the same two-dimensional plane. A bicycle fork can be secured near the first rotatable securement member, and a bicycle bottom bracket can be adapted to rest near the second rotatable securement member.

The first rotatable securement member may not exist if the elongated member is to be placed into, for example, a receptacle mounted to a moveable object, such as an automobile hitch. Therefore, according to this alternative embodiment, the elongated member can have a rotatable securement member only at the end at which the bicycle bottom bracket rests. The opposite end is simply configured to slideably secure into an automobile hitch, for example. Alternatively, instead of being slid into an automobile hitch, the opposite end can be configured to mount to a leg that rests against a stationary object, such as a garage floor. Accordingly, opposite ends of the elongated member can be configured to secure a pedaled bicycle either within a receptacle of a moveable object or onto a stationary object.

The present elongated member includes a bicycle fork securement member, having a pin threaded at one end and placed into a nut, with the opposite end having a handle for rotational movement of the threaded pin into the nut. With openings between the pin and nut at one end, and the pin a rotational handle at the other end, a fork of a bicycle can slide into the openings and be secured by rotational movement of the handle.

At the opposite end of the elongated member can exist a pad on which a bicycle bottom bracket rests. The bicycle fork securement member secures the bicycle in position, but can slide along the elongated member to a position such that the bicycle bottom bracket rests upon the pad when the bicycle is secured in place at the bicycle fork. At the end of the elongated member, near the bottom bracket pad, is a leg that can rotate around a pin that rotationally secures the leg to one end of the elongated member. The leg can be manufactured to extend, or telescope from a contracted position to an extended, deployed position. The telescopic leg can include a hollow housing and a slotted tube extending into the housing. The slotted tube can extend to change the length of the telescopic leg. In addition, the telescopic leg can be retracted and then folded back onto the elongated member in a low-profile, collapsed configuration so that a user can transport and easily store the support apparatus.

Moreover, the user may choose to mount the support apparatus onto a vertical wall, possibly along a railing, with one end of the elongated member slideably coupled to the vertically-extended railing, and the other end of the elongated member having a telescopic leg folded between the vertical railing and the elongated member that is now placed in a vertical orientation. In this orientation, the bicycle can be mounted to a wall with the back wheel and bottom bracket vertically below the bicycle front fork. In the vertical storage configuration, a bicycle can be mounted onto a wall for storage purposes.

Either with or without the telescopic leg, one end of the elongated member can be configured so that it can be coupled into a receptacle, and that receptacle can be a receiver hitch mounted on a moveable object, such as an automobile. Accordingly, the bicycle support apparatus and method for securing a bicycle to such an apparatus includes one that can mount on a stationary object, in a horizontal position (such as a floor) or a vertical position (such as a wall), or onto a moveable object, such as an automobile hitch. The support apparatus can also be placed in a fully deployed position for performing service on the bicycle, for example; or in a collapsed position for transport and storage purposes, for example.

BRIEF DESCRIPTION OF THE DRAWINGS

Other objects and advantages of the invention will become apparent upon reading the following detailed description and upon reference to the accompanying drawings in which.

Figure 1:
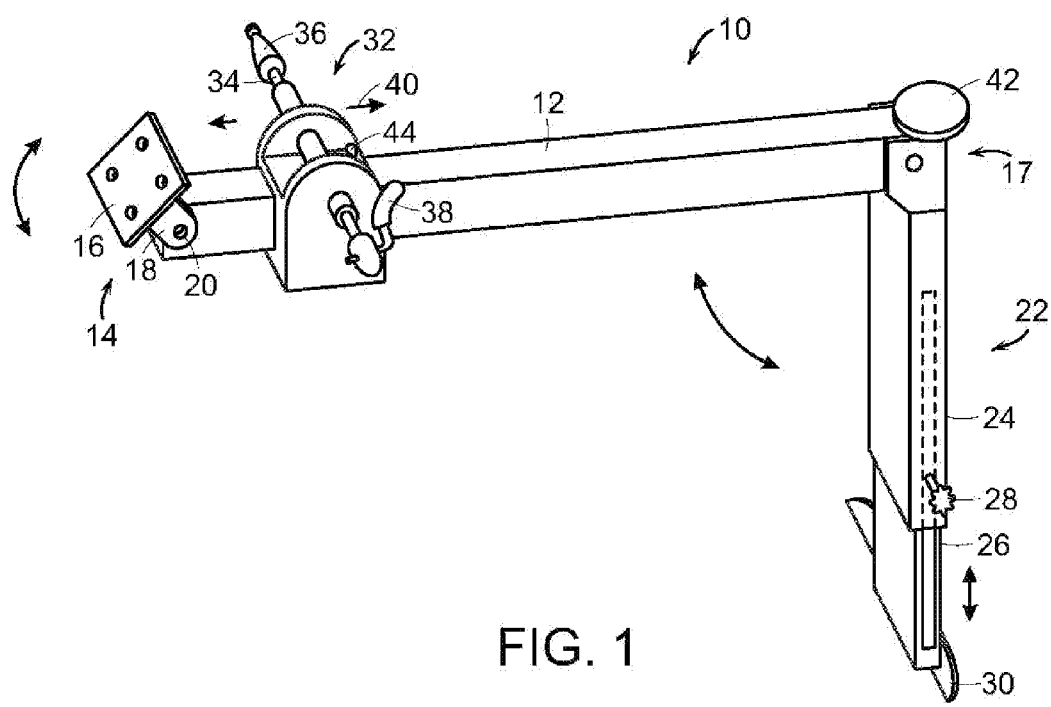
FIG. 1 is a perspective view of a bicycle support apparatus according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

The following description of various embodiments of the present bicycle support apparatus and method of supporting a bicycle are not to be construed in any way as limiting the subject matter of the appended claims.

FIG. 1 illustrates a bicycle support apparatus 10 configured to be placed onto a stationary object, such as a floor, and against a vertical, horizontal or angled surface that is also stationary.

Apparatus 10 includes an elongated member 12 having at one end a first rotatable securement member 14. At the opposite distal end of elongated member 12 is a second rotatable securement member 17. According to the embodiment of FIG. 1, first rotatable securement member 14 comprises a bracket 16 mounted to a housing 18. Housing 18 can include an aperture adapted to receive a pin 20. Pin 20 can extend through elongated member 12 perpendicular to the two-dimensional plane in which the first rotatable securement member 14 and second rotatable securement member 17 rotate. Bracket 16 can also include at least one aperture for receiving, for example, a screw for attaching bracket 16 to either a vertical or horizontal surface, such as a wall, table, or shelf. Since first securement member 14 can secure anywhere along its rotational axis of pin 20, bracket 16 can be attached to a horizontal surface, vertical surface, or a surface at an axis therebetween.

Coupled to second rotatable securement member 17 is telescopic leg 22. Leg 22 comprises a hollow housing 24 and slotted tube 26 which extends into one end of housing 24. Screw 28 can be hand tightened to secure tube 26 into housing 24 along the slots shown. Pad 30 attached to the distal end of tube 26 is configured to rest on a stationary object, such as a floor. Slideably mounted onto elongated member 12 is bicycle fork securement member 32. Member 32 includes pin 34 having one end that is threaded into nut 36, and the other end is secured to handle 38. When handle 38 is rotated and nut 36 is prevented from rotating, the inward facing surfaces of handle 38 and nut 36 are compressed against the fork of a bicycle to secure the bicycle onto member 32. Member 32 slides along the arrows 40 towards either ends of elongated member 12 so that the bottom bracket of a bicycle can rest on pad 42. With the bicycle secured via its fork within member 32 and resting on pad 42, the bicycle can be coupled in a horizontal direction with the back wheel sitting beyond pad 42, and the front fork (with the front wheel removed) secured onto member 32. Pin 44 can be hand tightened to secure member 32 in position along the elongated member 12.

Figure 2:
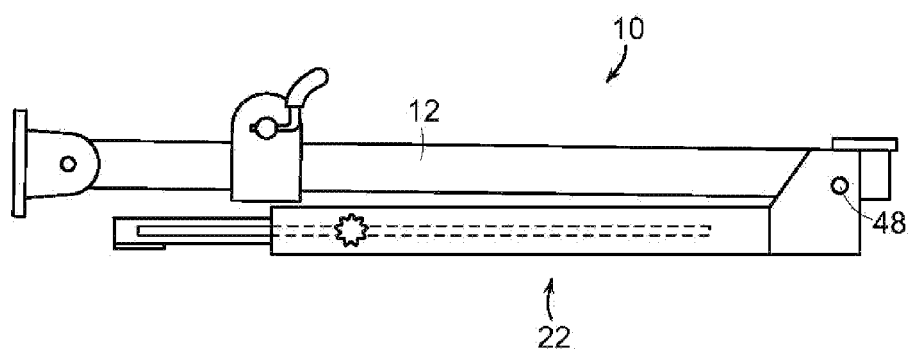
FIG. 2 is a side view of the bicycle support apparatus folded onto itself in a collapsed configuration for transport and storage according to one embodiment.

FIG. 2 illustrates apparatus 10 placed in a collapsed or low-profile configuration. When leg 22 is rotated about pin 48, leg 22 at least partially abuts elongated member 12. Whenever leg 22 and elongated member 12 abut one another in a collapsed position, apparatus 10 can be carried by a user to a place of storage, for example.

Figure 3:
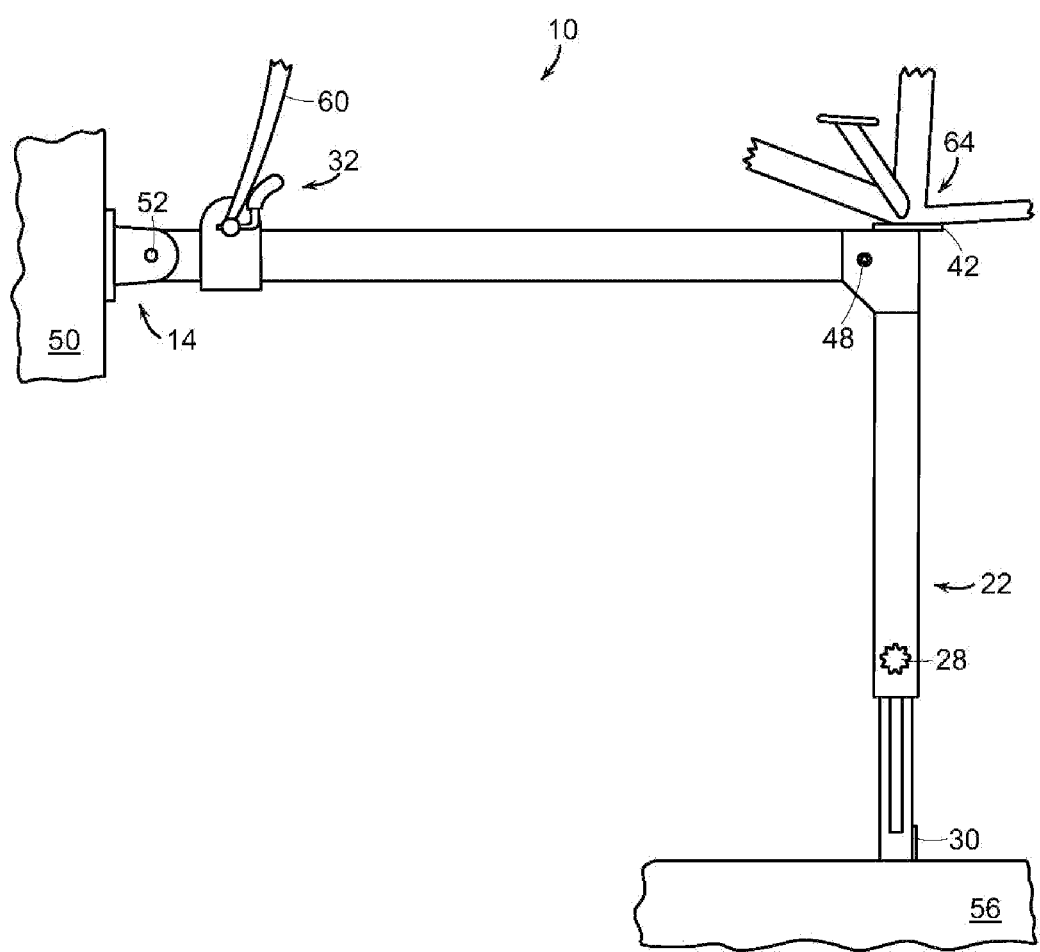
FIG. 3 is a side view of the bicycle support apparatus extended onto a floor and attached to a stationary object, with a bicycle fork and bottom bracket shown secured to the support apparatus according to one embodiment.

FIG. 3 illustrates apparatus 10 deployed in a support configuration. When member 14 is rotated about pin 52 within the same plane at which leg 22 is rotated about pin 48, member 14 can be secured to vertical surface 50 or any horizontal, vertical, or angled surface. Leg 22 can also be extended and secured to the appropriate vertical dimension by hand tightening screw 28 in order for pad 30 to rest upon horizontal surface 56. Bicycle front fork 60 can be coupled onto member 32, and bicycle bottom bracket 64 can rest upon pad 42. The configuration of FIG. 3 is one in which a bicycle can be placed in a horizontal position with the front wheel removed for easy access to the gearing, chain, brakes, etc. for performing maintenance on the bicycle. A user can turn the pedals of the bicycle when performing such maintenance, yet leave the bicycle secured onto apparatus 10.

Figure 4:
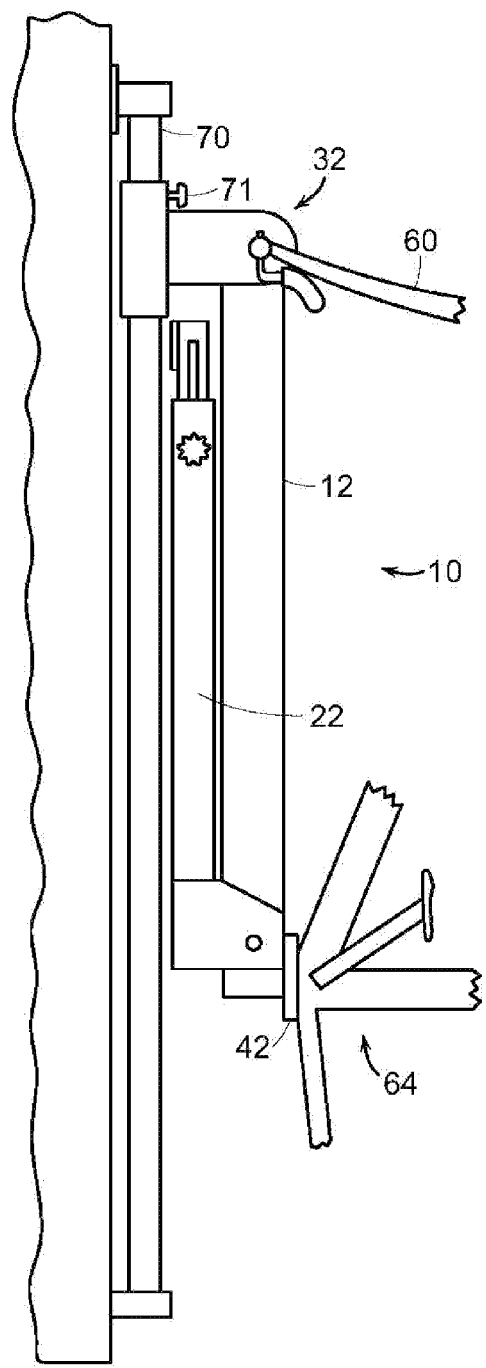
FIG. 4 is a side view of the bicycle support apparatus folded onto itself with one end securable along a vertical rail for attaching the bicycle fork and bottom bracket in an orientation so that a bicycle extends vertically upright for storage against a wall according to one embodiment.

FIG. 4 illustrates a bicycle placed in a vertical position. Apparatus 10 is mounted to a vertically displaced rail 70. Apparatus 10 can slide up or down along rail 70 while in the collapsed configuration of FIG. 2, for example. When collapsed, leg 22 is no longer used as a support mechanism and, instead, rests in a secured position yet slideable between rail 70 and elongated member 12. Bicycle front fork 60 can be secured to member 32, while bicycle bottom bracket 64 can rest upon pad 42. In the configuration of FIG. 4, a bicycle can be stored against a vertical surface, such as a wall. The apparatus can be secured at a specific vertical elevation by tightening a threaded securement member 71 to compress the distal end of member 32 against rail 70. If desired, maintenance on the bicycle can be performed if at least the front wheel is removed, for example.

Figure 5:
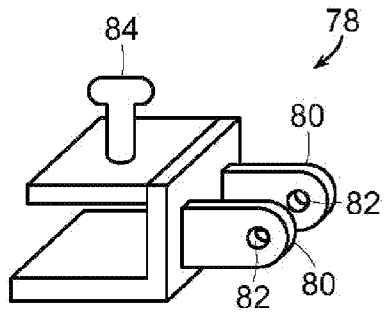
FIG. 5 is a perspective view of a receptacle for rotatably receiving a first end of the bicycle support apparatus onto a horizontally displaced table end according to an alternative embodiment.

FIG. 5 illustrates an alternative embodiment of the first rotatable securement member shown in FIG. 1. Instead of having a first rotatable securement member, the elongated member can simply have a plug that extends laterally in the direction of the elongated member. The plug comprises a hollow housing that extends around pins of a receptacle 78. Receptacle 78 includes two protrusions 80 with corresponding apertures 82. Protrusions 80 extend into the hollow plug at one end of the elongated member 12 (FIG. 1), with first rotatable securement member 14 removed. A pin can extend through the apertures within elongated member 12 and through the apertures 82 on protrusions 80 to attach elongated member 12 to receptacle 78. Receptacle 78 can be secured to the edge of a bench or table, for example, by pin 84 which can be hand tightened upon the upper surface of the table with the table secured between the distal end of pin 84 and the bottom surface of the U-shaped opening of receptacle 78.

Figure 6:
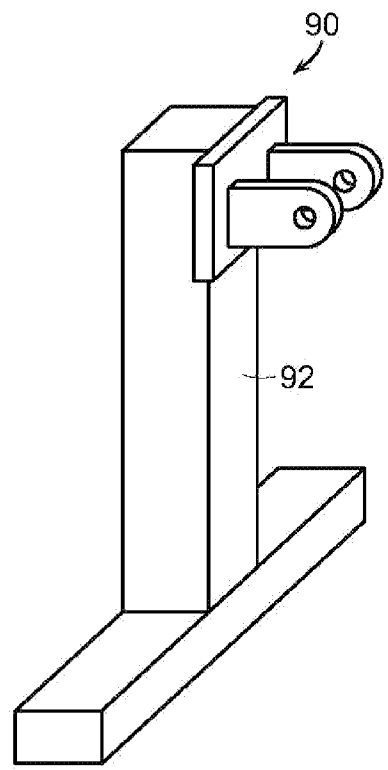
FIG. 6 is a perspective view of a receptacle mounted to a vertical leg that rests upon a horizontal floor according to an alternative embodiment.

FIG. 6 illustrates an alternative embodiment to the receptacle of FIG. 5. The receptacle 90 can be securely mounted to a stationary leg 92. Stationary leg 92 in combination with receptacle 90 allows one end of elongated member 12 (FIG. 1) to be supported by a horizontal surface, such as a floor, thereby making a free-standing mount.

Figure 7:
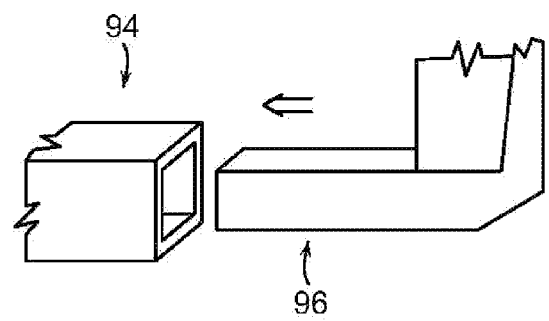
FIG. 7 is a perspective view of a bicycle hitch receptacle mounted to a moveable object, such as an automobile, for receiving a configured first end of the bicycle support apparatus.

FIG. 7 illustrates how apparatus 10 can be secured to a moveable object, such as the hitch of an automobile. For example, receiver hitch 94 can receive a plug 96 that extends downward from, and then along the same axis as, elongated member 12 (FIG. 1). Plug 96 slideably secures into hitch 94. Alternatively, plug 96 can extend from hitch 94 and upward to a receptacle 90, which then couples to the hollow housing of a plug, similar to the configuration of FIG. 5, for example. The configuration of FIG. 7 includes any geometry allowing one end of the elongated member to be fixedly secured to the hitch of an automobile.

Further modifications and alternative embodiments of various aspects of the invention will be apparent to those skilled in the art in view of this description. It is intended that the following claims be interpreted to embrace all such modifications and changes and, accordingly, the specification and drawings are to be regarded in an illustrative rather than a restrictive sense.

What is claimed is:

1. A bicycle support apparatus, comprising:
    an elongated member having at opposite ends a first rotatable securement member and a second rotatable securement member, each of which pivot in the same two dimensional plane;
    a bicycle fork securement member adapted for slideable securement along the elongated member nearer the first rotatable securement member than the second rotatable securement member; and
    a bicycle bottom bracket pad coupled nearer the second rotatable securement member than the first securement member.

2. The bicycle support apparatus according to claim 1, wherein the first rotatable securement member comprises a bracket attached to a housing having an aperture adapted to receive a pin extending also through the elongated member perpendicular to said two dimensional plane.

3. The bicycle support apparatus according to claim 2, wherein said bracket comprising at least one aperture for receiving a screw for attachment to a vertical surface.

4. The bicycle support apparatus according to claim 2, wherein said bracket comprising two parallel plates, one of which includes an aperture for receiving a screw having a distal end that compresses against a top of a horizontal table and a bottom of the horizontal table compressed against the lower of the parallel plates.

5. The bicycle support apparatus according to claim 2, wherein the said bracket is adapted to slideably secure along a vertical rail mounted to a vertical surface.

6. The bicycle support apparatus according to claim 1, wherein the second rotatable securement member is a telescopic leg having at one end an aperture adapted to receive a pin extending also through the elongated member perpendicular to said two dimensional plane.

7. The bicycle support apparatus according to claim 6, wherein the telescopic leg comprises a hollow elongated housing and a slotted tube extending into one end of the hollow elongated housing and secured with a threaded pin extending through the hollow housing and into said slotted tube.

8. The bicycle support apparatus according to claim 6, wherein the telescopic leg rotates about said pin and within the two dimensional plane.

9. The bicycle support apparatus according to claim 8, wherein the telescopic leg, when fully rotated into a collapsed position, abuts at least a portion of the elongated member.

10. The bicycle support apparatus according to claim 8, wherein the telescopic leg, when fully rotated into an extended position, extends approximately perpendicular to the elongated member.

11. The bicycle support apparatus according to claim 1, wherein the bicycle fork securement member comprises a pin threaded at one end and extending perpendicular to the two dimensional plane through a hollow tube and having a handle at an end opposite the end having threads, wherein two gaps exists within the hollow tube to accommodate a bike front fork frictionally secured onto the pin via movement of the handle.

12. The bicycle support apparatus according to claim 1, wherein the bicycle bottom bracket pad comprises a non-metal material onto which a bicycle bottom bracket is adapted to rest when a bicycle is placed thereon.

13. A bicycle support apparatus, comprising:
    an elongated member having a rotatable securement member attached at one end of the elongated member and adapted to rotate within a two dimensional plane;
    a plug configured at distal portion of the other end of the elongated member opposite the end on which the rotatable securement member is attached;
    a bicycle fork securement member adapted for slideable securement along the elongated member; and
    a bicycle bottom bracket pad coupled nearer the rotatable securement member than the bicycle fork securement member.

14. The bicycle support apparatus as recited in claim 13, wherein the plug is configured to slideably secure within a receptacle.

15. The bicycle support apparatus as recited in claim 14, wherein the receptacle is an opening of a hitch secured to an automobile.

16. The bicycle support apparatus as recited in claim 14, wherein the receptacle is a plate having at least one prong housing extending from a planar surface of the plate and having at least one aperture extending through the prong to accommodate a pin placed through the plug.

17. The bicycle support apparatus as recited in claim 16, wherein the plate is attached to a vertically extending leg that is coupled to a horizontally extending base.

18. A method for supporting a bicycle, comprising:
    coupling a first end of an elongated member to a moveable receptacle such as a bicycle hitch mounted to an automobile;
    rotating a telescopic leg within a two dimensional plane about a pin extending through a second end of the elongated member such that at least a portion of the telescopic leg is maintained in a collapsed position against the elongated member;
    securing a bicycle fork within a bicycle fork securement member slideably coupled along the elongated member nearing the first end than the second end; and
    resting a bicycle bottom bracket onto a bicycle bottom bracket pad coupled nearer the second end than the first end.

19. The method as recited in claim 18, further comprising:
    removing the bicycle fork from the bicycle fork securement member and removing the bicycle bottom bracket from the bicycle bottom bracket pad;
    removing the first end of the elongated member from the moveable receptacle;

coupling the first end of the elongated member to a stationary surface;
rotating the telescopic leg about the pin such that the telescopic leg extends substantially perpendicular to the elongated member and maintained in a deployed position;
extending the telescopic leg such that the elongated member is substantially horizontal;
re-securing the bicycle fork within the bicycle fork securement member; and
re-resting the bicycle bottom bracket onto a bicycle bottom bracket pad.

\* \* \* \* \*